US012235900B2

(12) United States Patent
Fabian et al.

(10) Patent No.: US 12,235,900 B2
(45) Date of Patent: Feb. 25, 2025

(54) COMPUTER-IMPLEMENTED DATA STRUCTURE, ELECTRONIC STORAGE MEDIUM, AND METHOD FOR DATA EXCHANGE

(71) Applicant: Robert Bosch GmbH, Stuttgart (DE)

(72) Inventors: Richard Fabian, Stockport (GB); Tilman Sinning, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/512,183

(22) Filed: Nov. 17, 2023

(65) Prior Publication Data

US 2024/0202243 A1 Jun. 20, 2024

(30) Foreign Application Priority Data

Dec. 16, 2022 (DE) ...................... 10 2022 004 779.9

(51) Int. Cl.
*G06F 5/06* (2006.01)
*G06F 16/901* (2019.01)

(52) U.S. Cl.
CPC ............ *G06F 16/9024* (2019.01); *G06F 5/06* (2013.01)

(58) Field of Classification Search
CPC .............................. G06F 16/9024; G06F 5/06
See application file for complete search history.

(56) References Cited

U.S. PATENT DOCUMENTS

| | | | |
|---|---|---|---|
| 6,539,453 B1* | 3/2003 | Guterman ........... | G06F 12/0246 711/170 |
| 6,732,124 B1* | 5/2004 | Koseki ................ | G06F 12/0868 711/119 |
| 9,542,431 B2* | 1/2017 | Prabhakaran ....... | G06F 16/2365 |
| 2005/0240745 A1* | 10/2005 | Iyer ..................... | G06F 13/1668 711/E12.079 |
| 2006/0117213 A1* | 6/2006 | Chapman ............ | G06F 11/1016 714/5.11 |
| 2007/0260614 A1* | 11/2007 | Bray ..................... | G06F 16/235 |
| 2019/0324947 A1* | 10/2019 | Lv ....................... | G06F 11/1451 |

* cited by examiner

*Primary Examiner* — Jorge A Casanova
(74) *Attorney, Agent, or Firm* — NORTON ROSE FULBRIGHT US LLP; Gerard A. Messina

(57) ABSTRACT

A computer-implemented data structure for a singly linked list for data exchange between a write process and at least one read process. The data structure includes a first pointer data structure and a second pointer data structure, wherein the first pointer data structure points to the oldest element in the list, and the second pointer data structure points to the next writable element in the list. The data structure also includes a third pointer data structure, a fourth pointer data structure, and a fifth pointer data structure, wherein the third pointer data structure has a corresponding first counter, the fourth pointer data structure has a corresponding second counter, and the fifth pointer data structure has a corresponding counter.

8 Claims, 4 Drawing Sheets

COMPUTER-IMPLEMENTED DATA STRUCTURE, ELECTRONIC STORAGE MEDIUM, AND METHOD FOR DATA EXCHANGE

CROSS REFERENCE

The present application claims the benefit under 35 U.S.C. § 119 of German Patent Application No. DE 10 2022 004 779.9 filed on Dec. 16, 2022, which is expressly incorporated herein by reference in its entirety.

FIELD

The present invention relates to a computer-implemented data structure for exchanging data between a write process, also called a "transmitter" or "writer", and at least one read process, also called a "receiver" or "reader". In addition, the present invention relates to a corresponding electronic storage medium and to a corresponding device.

BACKGROUND INFORMATION

The communication scheme "first in, first out" or "FIFO" is known from informatics. An implementation of the scheme for communication between two concurrent processes, for example a write process and one or more read processes, can be effected by means of a transmission list into which the write process can continuously write new data, while the at least one read process can continuously read the oldest data. A singly linked list is suitable as a data structure for the transmission list.

SUMMARY

The present invention provides a computer-implemented data structure for a singly linked list for data exchange between a write process (transmitter/writer) and at least one read process (receiver/reader) having a first pointer data structure and a second pointer data structure, wherein the first pointer data structure points to the oldest element in the list and the second pointer data structure points to the next writable element in the list.

An example embodiment of the present invention provides a third pointer data structure, a fourth pointer data structure, and a fifth pointer data structure, wherein the third pointer data structure has a corresponding first counter, the fourth pointer data structure has a corresponding second counter, and the fifth pointer data structure has a corresponding counter.

A singly linked list can be understood to mean a data structure in which the elements of the data structure, in addition to a data field for storing data, comprise a pointer data structure to the next element in the list. The pointer data structure of the last element in the list points to a so-called null element, also called a null pointer.

A pointer data structure, also called a "pointer", can in the present case be understood to mean a data structure which, instead of a datum, contains a reference to a (physical) memory area in which the datum is stored.

A corresponding counter can be understood to mean a data field that is configured to count up or down depending on a condition or at or after the occurrence of an event, or to be set to a fixed value, or to be reset to an initial value. Typically, so-called integer data types, also called "integers" or "doubles", are used for such data fields. Depending on the counter size to be expected, a corresponding set of bits or bytes can be provided for the data field.

According to an example embodiment of the present invention, the third pointer data structure, the fourth pointer data structure and the fifth pointer data structure each point to the next element to be read in the list in the data structure.

By means of this data structure, it is possible for the write process to be able to write new data at any time into the data structure, since elements that have already been written therein can be removed from the data structure at any time, even when these elements have not yet been read by one of the read processes, even when the read process is attempting to read the same element at the same moment.

In addition, the read process can read unread elements in the data structure at any time without getting into conflict with the write process.

According to one example embodiment of the present invention, the third pointer data structure, the fourth pointer data structure and the fifth pointer data structure always point to the element in the list to which the first or the second pointer data structure is pointing or point to an element between the first and second pointer data structures.

An element between the element to which the first pointer data structure points and the element to which the second data structure points is to be understood as an element which is skipped when, starting from the element to which the first pointer data structure points, the list is passed through up to the element to which the second data structure points. This passing-through can take place in such a way that the element to which the pointer data structure of the previous element points as being next is regarded as the next element in the list.

According to one example embodiment of the present invention, the third pointer data structure and the fourth pointer data structure can be modified exclusively by one of the at least one read processes.

This can be achieved, for example, by the third pointer data structure being in a memory area which is assigned exclusively to one of the at least one read processes.

According to one example embodiment of the present invention, the first and second pointer data structures can be modified exclusively by the write process.

This can be achieved, for example, by the first and second pointer data structures being in a memory area which is assigned exclusively to the write process.

According to one example embodiment of the present invention, the elements in the list can be modified exclusively by the write process.

Another aspect of the present invention is a machine-readable storage medium on which the computer program according to one aspect of the present invention is stored.

Another aspect of the present invention is a device comprising an electronic storage medium according to the present invention.

BRIEF DESCRIPTION OF THE DRAWINGS

Further features and advantages of the aspects of the present invention are explained below with the aid of embodiments with reference to the figures.

DETAILED DESCRIPTION OF EXAMPLE EMBODIMENTS

Figure 1:
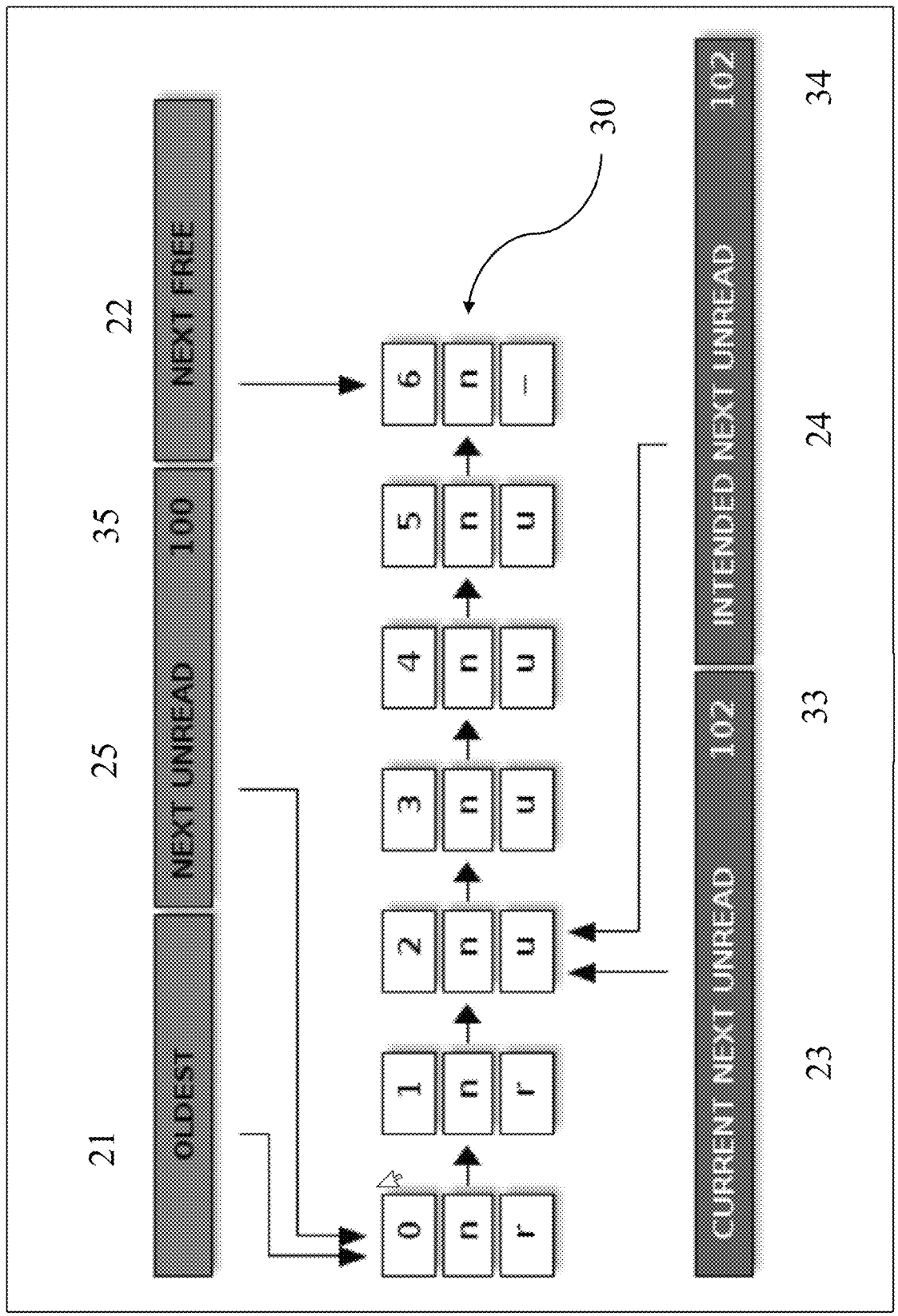
FIG. 1 shows a schematic representation of a data structure according to an example embodiment of the present invention.

FIG. 1 shows a schematic representation of a data structure according to the present invention. In the representation in FIG. 1, a first pointer data structure 21, a second pointer data structure 22, a third pointer data structure 23, a fourth pointer data structure 24, and a fifth pointer data structure 25 are shown.

The third pointer data structure 23, the fourth pointer data structure 24 and the fifth pointer data structure 25 each have corresponding first counters 33, second counters 34 and third counters 35, respectively.

Below the first pointer data structure 21, second pointer data structure 22, and fifth pointer data structure 25, there is a schematic representation of a singly linked list 30.

Each element in the list 30 consists of an index number, here 0 to 6, a pointer data structure n, which points to the next element in the list 30, also called the "next pointer", and a data field, here in each case with the character "r", "u" and "-". The "r" character indicates that the datum in the data field has already been read. The sign "u" indicates that the datum in the data field is still unread. The "-" character indicates that there is no datum or an invalid datum is present in the data field, and that accordingly the element in the list 30 is free, i.e., can be written.

The first pointer data structure 21, also called the "oldest", is used to display the oldest element in the list. The second pointer data structure 22, also called the "next free", is used to point to the next free element in the list. A free element is understood to mean an element into which a new datum can be written. This does not necessarily mean that the element is empty.

The third pointer data structure 23, also called the "current next unread", is used to point to the currently next unread element in the list 30. Accordingly, to the element that can or should be read by the read process as the currently next element.

The list is divided into two parts by the third pointer data structure 23. Into a first part comprising all already read elements in the list 30 and a second part comprising the as yet unread elements in the list 30.

The fourth pointer data structure 24, also called the "intended next unread", is used to point to what will be the next unread element in the list 30. This pointer is of importance for the at least one read process in order to check whether during a read attempt a colliding updating of the list 30 was performed by the write process.

The fifth pointer data structure 25, also called the "next unread", is used to point to the currently next unread element in the list 30. Accordingly, to the element that can or should be read by the write process as the current next element.

The list 30 is divided into two parts by the fifth pointer data structure 25. Into a first part comprising all already read elements in the list 30 and a second part comprising the as yet unread elements in the list 30.

It should be noted that the division by the third pointer data structure 23 does not necessarily have to be identical to the division by the fifth pointer data structure 25. That is to say, a list 30 can be divided differently for the write or read processes. Which division is the currently correct division depends on the values of the respective corresponding counters. The decisive factor is the pointer data structure with the higher value of the corresponding counter. When the value is the same, the division effected by the third pointer data structure 23 will apply.

Figure 2A:
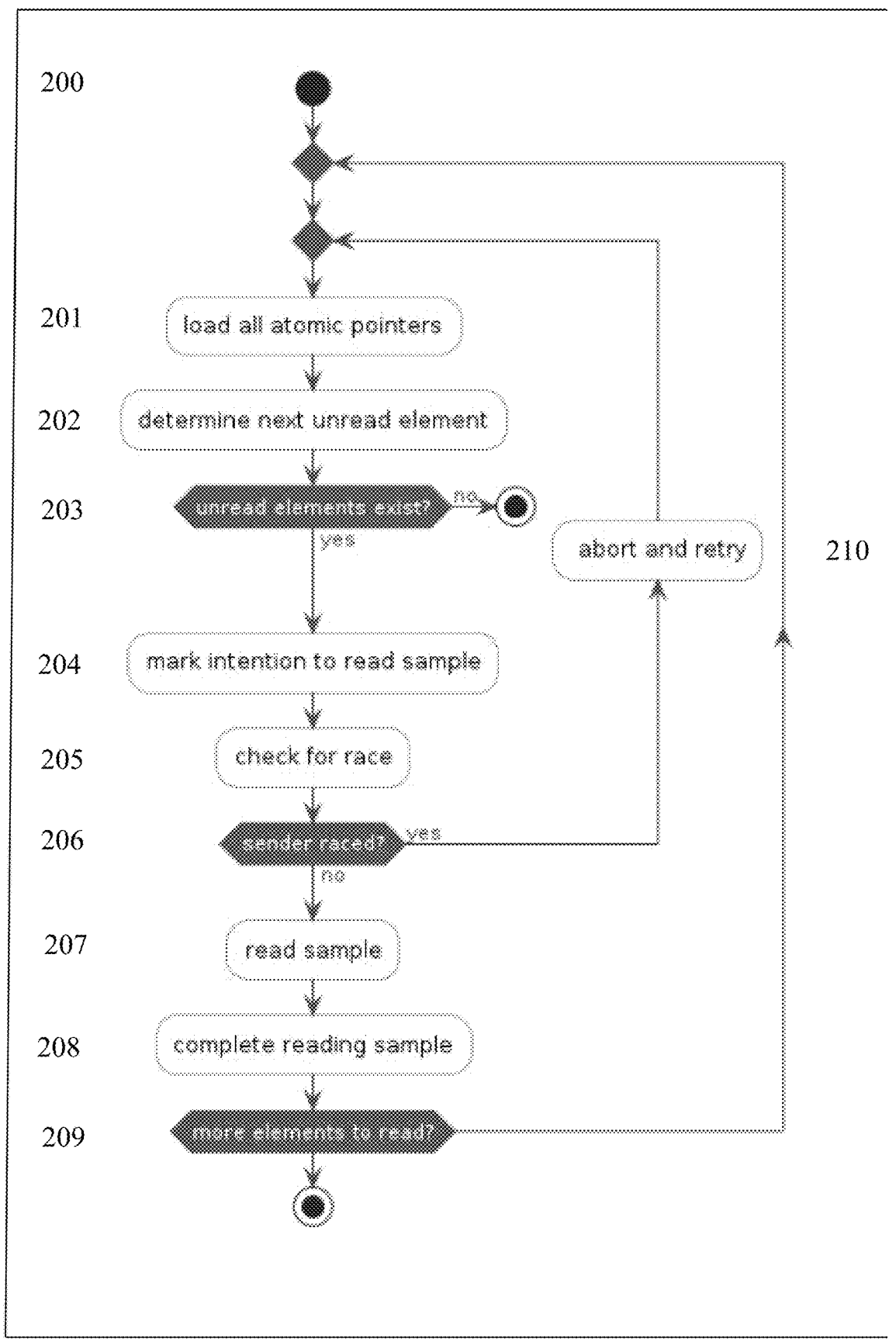
FIG. 2A shows a flowchart of the process of reading an unread element by one of the at least one read processes, according to an example embodiment of the present invention.

FIG. 2A shows a flowchart of the process of reading an unread element by one of the at least one read processes.

The method begins with step 200.

In step 201, the third pointer data structure, the fourth pointer data structure and the fifth pointer data structure are each loaded together with their corresponding counters. This step can be carried out atomically. An atomic execution of a step can be understood to mean that the combination of individual operations, considered as a logical unit, only runs successfully or fails as a whole and cannot be interrupted by other operations.

In step 202, the next unread element is determined. This takes place depending on the values of the corresponding counters in each case. Since in each operation on the third, fourth or fifth pointer data structure the corresponding counter is correspondingly adapted, the element to which the pointer data structure with the highest value of the corresponding counter points is the next unread element. When the value is the same, the element is considered to be the next unread element to which the third pointer data structure 23 is pointing.

In step 203, a check is performed as to whether an unread element is present in the list 30. This can be done by comparing the pointer data structure determined in step 202 with the second pointer data structure. If the two pointer data structures point to the same element in the list 30, then at that moment there is no unread element present in the list 30. The method ends.

In step 204, the fourth pointer data structure is updated. This can be done by the fourth pointer data structure pointing to the element following the element determined in step 202. In this case, the corresponding counter of the fourth pointer data structure is set to the value of the pointer data structure determined in step 202 and incremented.

In what follows, a check is performed as to whether a so-called "race condition" has occurred between the write process and one of the at least one read processes. This can be done by the fifth pointer data structure and its corresponding counter being reloaded (step 205) and a check carried out (step 206) as to whether the value of the corresponding counter has increased in the meantime. If this is the case, a so-called "race condition" has occurred. The method then continues to be terminated with this step and in addition with step 210.

In step 207, the next unread element is read.

In step 208, the third and fifth pointer data structures as well as the corresponding counters are updated.

In step 209, a check is performed as to whether there are still further unread elements. This can be done in the same way as described in steps 201 to 203.

Figure 2B:
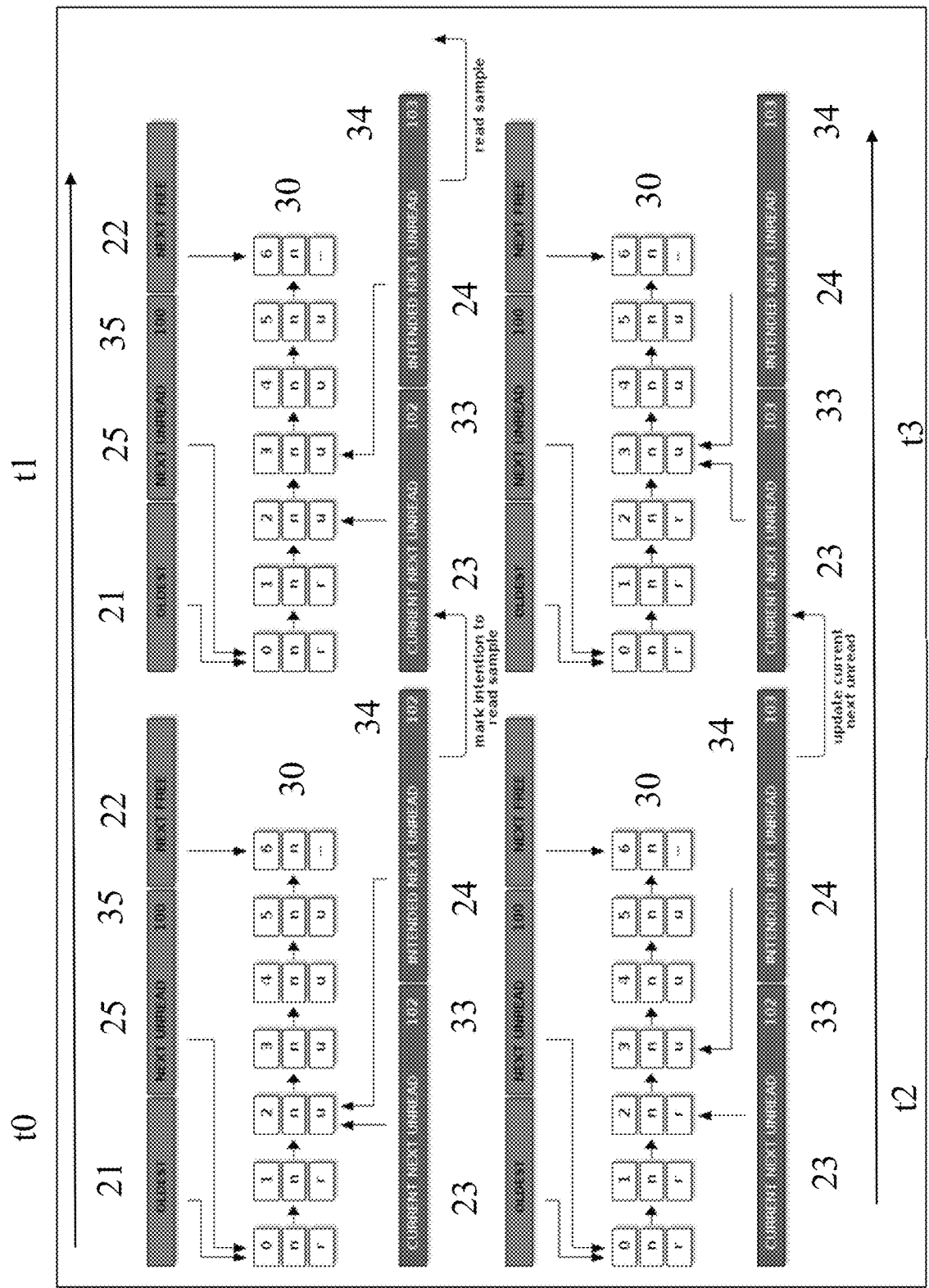
FIG. 2B shows a schematic representation of a data structure according to an example embodiment of the present invention when the next element is being read.

FIG. 2B shows a schematic representation of a data structure according to the present invention when the next element is being read.

At time t0, the corresponding counters of the third and fourth pointer data structures have the highest values. The two pointer data structures point to element 2 in the list 30. Accordingly, element 2 is the next unread element.

At time t1, the fourth pointer data structure 24 is updated by pointing to the element following element 2, in the situation illustrated this is element 3. In this case, the corresponding counter 34 of the fourth pointer data structure 24 is incremented.

At time t2, the data field of element 2 is read. The character in the data field changes accordingly from time t1 "u"="unread" to "re"="read".

At time t3, the third pointer data structure 23 is updated by pointing to the element of the fourth pointer data structure 24. The corresponding counter 33 is incremented thereby.

Figure 3:
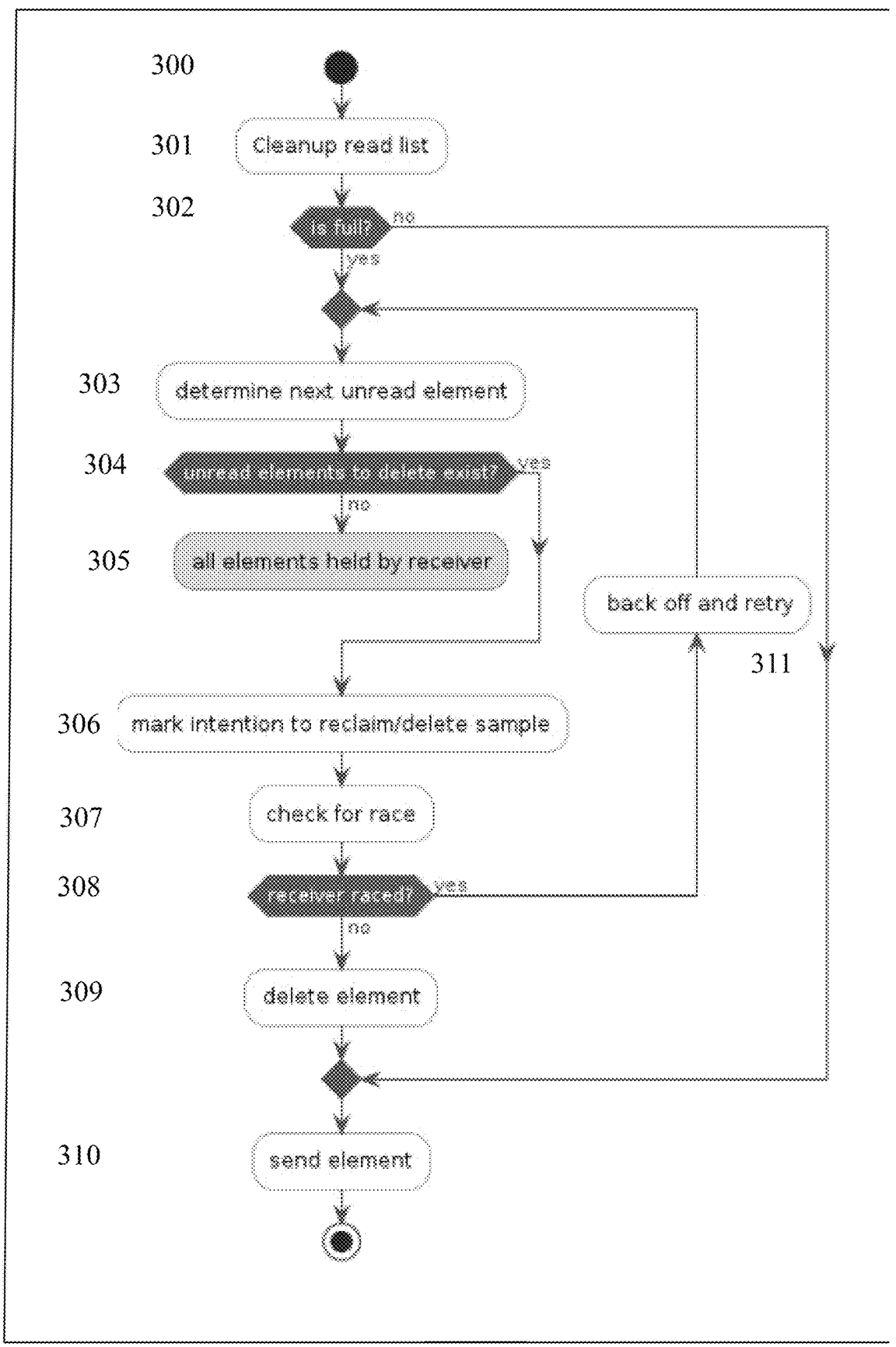
FIG. 3 shows a flowchart of a process of overwriting an already written (and not yet read) element, according to an example embodiment of the present invention.

FIG. 3 shows a flowchart of a process of overwriting an already written (and not yet read) element.

The method begins in step 300 in that a new datum is to be written by the write process into the data structure according to the present.

In step 301, all the skipped and recalled elements in the list are first cleaned up. This may be done by the write process, starting from the element to which the first pointer data structure points, going through all elements of the read part identifying and deleting the skipped and recalled elements.

In step 302, a check is performed as to whether the list 30 in the data structure according to the present invention is full. This can be done, for example, by checking whether the pointer data structure n of the element to which the second pointer data structure points is pointing to a valid target. If this is the case, the list 30 is not full.

If the list 30 is not full, it will not be necessary to overwrite an element. The method jumps directly to step 310.

If the list 30 is full, the determination of the latest next unread element follows in step 303. This can be done by comparing the values of the corresponding counters of the third, fourth and fifth pointer data structures. The pointer data structure with the highest value of the corresponding counter points to the latest next unread element.

In step 304, a check is performed as to whether there are any unread elements which can be deleted.

If this is not the case, the method terminates with step 305. Writing a new datum by overwriting has failed.

Otherwise, the method is continued in step 306 with a step of marking the next unread element for deletion. In step 307, a check is performed as to whether a so-called "race condition" has occurred between the write process and one of the at least one read processes.

If this is the case, the method terminates with step 311.

Otherwise, the method is continued in step 309 and the element marked for deletion is deleted.

In step 310, the element to be written is written into the data field of the next free element.

What is claimed is:

1. A computer-implemented data structure for a singly linked list of elements for data exchange between a write process and at least one read process, comprising:
    a first pointer data structure and a second pointer data structure, wherein the first pointer data structure points to an oldest element in the list and the second pointer data structure points to a next writable element in the list; and
    a third pointer data structure, a fourth pointer data structure, and a fifth pointer data structure, wherein the third pointer data structure has a corresponding first counter, the fourth pointer data structure has a corresponding second counter, and the fifth pointer data structure has a corresponding third counter.

2. The computer-implemented data structure according to claim 1, wherein the third pointer data structure, the fourth pointer data structure and the fifth pointer data structure always point to an element in the list to which the first pointer data structure or the second pointer data structure is pointing, or point to an element between the element to which the first pointer data structure is pointing and the element to which the second pointer data structure is pointing.

3. The computer-implemented data structure according to claim 1, wherein the third pointer data structure can be modified exclusively by the write process.

4. The computer-implemented data structure according to claim 1, wherein the first pointer data structure and the second pointer data structure can be modified exclusively by the write process.

5. The computer-implemented data structure according to claim 1, wherein the fourth pointer data structure and the fifth pointer data structure can be modified exclusively by any one of the at least one read processes.

6. The computer-implemented data structure according to claim 1, wherein the elements in the list can be modified exclusively by the write process.

7. A non-transitory storage medium on which is stored a computer-implemented data structure for a singly linked list of elements for data exchange between a write process and at least one read process, the computer-implemented data structure comprising:
    a first pointer data structure and a second pointer data structure, wherein the first pointer data structure points to an oldest element in the list and the second pointer data structure points to a next writable element in the list; and
    a third pointer data structure, a fourth pointer data structure, and a fifth pointer data structure, wherein the third pointer data structure has a corresponding first counter, the fourth pointer data structure has a corresponding second counter, and the fifth pointer data structure has a corresponding third counter.

8. A device, comprising:
    a non-transitory storage medium on which is stored a computer-implemented data structure for a singly linked list of elements for data exchange between a write process and at least one read process, the computer-implemented data structure including:
    a first pointer data structure and a second pointer data structure, wherein the first pointer data structure points to an oldest element in the list and the second pointer data structure points to a next writable element in the list; and
    a third pointer data structure, a fourth pointer data structure, and a fifth pointer data structure, wherein the third pointer data structure has a corresponding first counter, the fourth pointer data structure has a corresponding second counter, and the fifth pointer data structure has a corresponding third counter.

* * * * *